United States Patent Office 3,272,857
Patented Sept. 13, 1966

3,272,857
PROCESS FOR THE PREPARATION OF AROMATIC CARBOXYLIC ACIDS
Basil S. Farah and Everett E. Gilbert, Morris Township, Morris County, Edward S. Jones, Hanover Township, Morris County, and Julian A. Otto, Stockholm, N.J., assignors to Allied Chemical Corporation, New York, N.Y., a corporation of New York
No Drawing. Filed Dec. 30, 1963, Ser. No. 334,639
12 Claims. (Cl. 260—516)

This invention relates to a new process for the preparation of carboxylic acids and, more particularly, to a process for the production of carboxylic acids via the alkaline hydrolysis of hexahalohydroxyisopropyl aryl derivatives.

Carboxylic acids comprise one of the most versatile and useful classes of compounds in organic chemistry. For example, carboxylic acids have been used as pharmaceuticals, anesthetics, and as intermediates in the preparation of polyamides, polyesters, polyethers, polycarboxylic halides and the like. Production of many of these acids requires expensive multi-stage procedures or hard-to-prepare intermediates. For example, 4-aminobenzoic acid is made by the expensive process of nitrating toluene, separating the 4 isomer, oxidizing it to 4-nitrobenzoic acid and then reducing the latter to the desired 4-aminobenzoic acid.

It has now been found that the simple alkaline hydrolysis of hexahalohydroxyisopropyl aryl derivatives followed by acidification produces in high yield an almost unlimited number of carboxylic acids by a process which is both economical and efficient.

It is a principal object of the present invention to provide a new process for producing carboxylic acids. It is a further object to provide a process for the preparation of carboxylic acids in high yield and at minimum cost. Other objects and advantages will become apparent from the following description.

In accordance with the present invention, carboxylic acids are readily produced by a process which comprises admixing a hexahalohydroxyisopropyl aryl derivative of the general formula

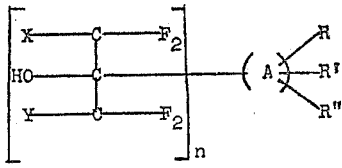

wherein X and Y are halogens selected from the group consisting of chlorine and fluorine, n is an integer from 1 to 2, A is an aryl radical, R, R' and R'' are members independently selected from the group consisting of hydrogen, alkyl, alkoxy, hydroxy, amino, dialkylamino and halogen with an alkali metal hydroxide, heating the reaction mixture at a temperature of from about 100° C. to the boiling point of the reaction mixture, acidifying the reaction mixture and recovering the resulting aromatic carboxylic acid therefrom. The above recited alkyl and alkoxy substituents preferably have 1 to 3 carbon atoms.

Throughout the present application, the term "carboxylic acid" is deemed to also include dicarboxylic acids. These dicarboxylic acids are produced when there exist two hexahalohydroxyisopropyl substituents on the aryl radical. More simply, referring to the general formula set forth above, dicarboxylic acids are produced wherein n is 2.

The aryl moiety of the reactant employed in the present invention may be selected from a wide and varied group of radicals. For example, the aryl radical may be phenyl, naphthyl, or that derived from phenyl ether or phenyl sulfide, and they may also contain various substituents as set forth above. Generally speaking, however, these hexahalohydroxyisopropyl aryl derivatives may be classified into three broad groups according to the aryl moiety present. These groups are substituted and nonsubstituted derivatives of aromatic hydrocarbons, aromatic amines and phenols. Processes for preparing these hexahalohydroxisopropyl aryl derivatives are described in co-pending U.S. applications. U.S. application of Farah et al., Serial No. 329,891, filed December 11, 1963, describes the preparation of aromatic hydrocarbon derivatives, U.S. application of Jones, Serial No. 329,889, filed December 11, 1963, describes the preparation of aromatic amine derivatives, and U.S. application of Gilbert et al., Serial No. 327,520, filed December 2, 1963, describes the preparation of phenol derivatives. Generally, these co-pending applications describe a reaction of hexahaloacetone with either the aromatic hydrocarbons, aromatic amines or phenols.

Illustrative of specific compounds which are derived from aromatic hydrocarbons are the following:
1-(hexafluoro-2-hydroxy-2-propyl)benzene
1-(hexafluoro-2-hydroxy-2-propyl)-4-methylbenzene
1,4-bis(hexafluoro-2-hydroxy-2-propyl)benzene
2,4-bis(hexafluoro-2-hydroxy-2-propyl)-1-methylbenzene
1-(hexafluoro-2-hydroxy-2-propyl)-3,4-dimethylbenzene
1,3-bis(hexafluoro-2-hydroxy-2-propyl)-4,5-dimethylbenzene
1-(hexafluoro-2-hydroxy-2-propyl)-2,4-dimethylbenzene
1,4-bis(hexafluoro-2-hydroxy-2-propyl)-2,5-dimethylbenzene
1-(hexafluoro-2-hydroxy-2-propyl)-3-chloro-4-methylbenzene
1-(hexafluoro-2-hydroxy-2-propyl)naphthalene
1,4-bis(hexafluoro-2-hydroxy-2-propyl)naphthalene
4,4-bis(hexafluoro-2-hydroxy-2-propyl)phenyl ether
4,4-bis(hexafluoro-2-hydroxy-2-propyl)phenyl sulfide
1-(1,1,3,3-tetrafluoro-1,3-dichloro-2-hydroxy-2-propyl)-4-methylbenzene
2,4-bis(1,1,3,3-tetrafluoro-1,3-dichloro-2-hydroxy-2-propyl)-1-methylbenzene
1-(1,1,3,3-tetrafluoro-1,3-dichloro-2-hydroxy-2-propyl)-3,4-dimethylbenzene
1,4-bis(1,1,1,3,3-pentafluoro-3-chloro-2-hydroxy-2-propyl)-4,5-dimethylbenzene
1,3-bis(1,1,1,3,3-pentafluoro-3-chloro-2-hydroxy-2-propyl)-4,6,-dimethylbenzene, and the like.

Specific compounds derived from aromatic amines include:
1-(hexafluoro-2-hydroxy-2-propyl)-4-aminobenzene
1-(1,1,3,3-tetrafluoro-1,3-dichloro-2-hydroxy-2-propyl)-4-4-aminobenzene
1-(1,1,1,3,3-pentafluoro-3-chloro-2-hydroxy-2-propyl)-2-chloro-4-aminobenzene
4-(hexafluoro-2-hydroxy-2-propyl)-2-methylaniline
2-(hexafluoro-2-hydroxy-2-propyl)-5-methylaniline
2-(hexafluoro-2-hydroxy-2-propyl)-4-methylaniline
4-(hexafluoro-2-hydroxy-2-propyl)-2,6-dimethylaniline
4-(hexafluoro-2-hydroxy-2-propyl)-N,N-dimethylaniline
4-(hexafluoro-2-hydroxy-2-propyl)-2-hydroxyaniline
4-(hexafluoro-2-hydroxy-2-propyl)-3-methoxyaniline
2(hexafluoro-2-hydroxy-2-propyl)-1-naphthylamine, and the like.

Specific compounds derived from phenolic compounds include:
2-(1,1,3,3-tetrafluoro-1,3-dichloro-2-hydroxy-2-propyl)-phenol 2-(1,1,3,3-tetrafluoro-1,3-dichloro-2-hydroxy-2-propyl)-
4-methylphenol 4-(1,1,3,3-tetrafluoro-1,3-dichloro-2-hydroxy-2-propyl)-
2,6-dimethylphenol, and the like.

As previously recited, these hexahalohydroxyisopropyl aryl derivatives are reacted with an alkali metal hydroxide as illustrated by sodium, potassium, and lithium hydroxide. In preferred operation, however, potassium hydroxide is utilized since it exhibits superior solubility properties.

Reaction with the alkali metal hydroxide produces a carboxylate salt which is readily converted to the corresponding carboxylic acid by simple acidification. The acidifying agent normally employed is a mineral acid such as hydrochloric, sulfuric, nitric, hydrobromic, and hydrofluoric acid. Organic acids, such as the halogenated acetic acids or aliphatic or aromatic sulfonic acids, may also be used.

It should also be noted that while the present invention is primarily concerned with the production of carboxylic acids via the alkaline hydrolysis of hexahalohydroxyisopropyl aryl derivatives, the by-product formed during reaction is a valuable commercial product. By way of illustration, the alkaline hydrolysis with potassium hydroxide of hexafluorohydroxyisopropyl benzene produces, in addition to the desired benzoic acid, gaseous fluoroform. This reaction is prepresented as follows:

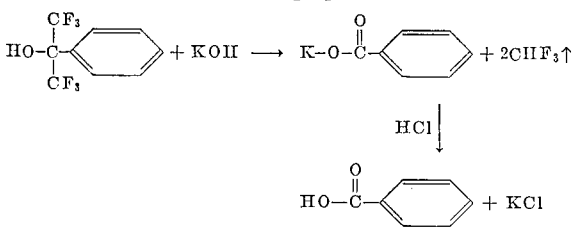

Fluoroform and other fluorinated by-products obtained by the process of this invention are eminently useful as blowing agents, chemical intermediates or refrigerants and are commercially available under the trademark, "Genetron," produced by Allied Chemical Corporation.

The molar ratio of the reactants may vary over a wide range, i.e. from about 3 to 15 mols alkali metal hydroxide per mol hexahalohydroxyisopropyl aryl derivative. A molar ratio of less than 3:1 does not produce the desired carboxylic acid in economical yields whereas a molar ratio in excess of 15:1 serves no useful purpose and the alkali is merely left unconsumed. In preferred operation, highest yields are obtained when a molar ratio of from 5 to 10 mols alkali metal hydroxide per mol hexahalohydroxyisopropyl aryl derivative is employed.

It has been found that minimum reaction temperature of 100° C. is necessary in order to secure the desired carboxylic acid product in yields which are consistent with economical operation. The reaction temperature may vary between 100° C. and the boiling point of the reaction mixture and it is preferred to operate at reflux temperatures which normally fall within the range of from about 175° to 250° C.

For ease of reaction and highest yields, it is preferred that a solvent be employed to facilitate reaction and allow for reaction at elevated temperatures. Low boiling solvents may be utilized if the reaction is carried out under pressure. The solvent employed should be inert under the conditions of reaction, be a solvent for the reactants and resulting carboxylic acid product and exhibit a minimum degree of miscibility with the alkali metal hydroxide employed. Illustrative of such solvents are 2,2'-oxydiethanol, ethylene glycol, propylene glycol, polyglycol ethers, and the like.

The amount of solvent employed may range over a wide range from about 1 to 10 parts, preferably 5 to 7 parts, solvent per part hexahalohydroxyisopropyl aryl derivative.

The recovery of the carboxylic acid product is conventional and is readily effected by the acidification step. In other words, the acidification of the carboxylic acid salt to its corresponding acid also effects precipitation out of solution of the acid followed by isolation by filtration. The amount of acid added should be sufficient to decrease the pH of the reaction mixture to about 7 in the case of the amines and below 7 for the aryl and phenol derivatives. Various purification means may be employed such as recrystallization, utilizing decolorizing agents such as carbon, or by extraction with ether followed by evaporization off of the ether. Generally speaking, the carboxylic acids produced are solids whose melting points range from about 100° C. up to as high as 350° C.

The following examples are given for the purpose of illustration and should not be construed as limiting the present invention in any manner. In the examples, parts are by weight.

Example 1

To a suitable vessel was added a reaction mixture comprised of 2.6 parts of 2-(hexafluoro-2-hydroxy-2-propyl)phenol, 6.0 parts of potassium hydroxide and 20 parts of 2,2'-oxydiethanol, as solvent. The resulting reaction mixture was agitated and heated at a temperature of about 175° C. for a period of about 4 hours. The resulting reaction mixture containing potassium salicylate was cooled and 100 parts of water were added. The potassium salicylate was then converted to its corresponding acid by the addition of a dilute solution of aqueous hydrochloric acid until the reaction mixture exhibited a pH of about 7. The crude salicylic acid precipitated out of solution and was then extracted 3 times with ether and isolated as a black solid by evaporating off the ether. Purification by recrystallization with water in the presence of decolorizing carbon yielded 1.2 parts of salicylic acid as a white solid having a melting point of 158–160° C. which is identical with the melting point reported in reference literature.

Substantially the same procedure employed in Example 1 was utilized in Examples 2–4, the results of which are set forth below in Table 1.

TABLE 1.—EXAMPLES 2–4

| Hexahalohydroxyisopropylphenol reactant | Carboxylic Acid | Percent Yield [1] | Melting Point ° C. | |
|---|---|---|---|---|
| | | | Theory [2] | Found |
| 2-(1,1,3,3-tetrafluoro-1,3-dichloro-2-hydroxy-2-propyl)-phenol. | Salicylic | 58 | 158–160 | 158–160 |
| 2-(1,1,3,3-tetrafluoro-1,3-dichloro-2-hydroxy-2-propyl)-4-methylphenol. | 2,5-cresotic | 36 | 153 | 153–154 |
| 4-(1,1,3,3-tetrafluoro-1,3-dichloro-2-hydroxy-2-propyl)-2,6-dimethylphenol. | 3,5-dimethyl-4-hydroxybenzoic | 3 | 218 | 220–221 |

[1] Calculated on the basis of the amount of hexahalohydroxyisopropyl phenol derivative charged.
[2] As reported in reference literature.

Example 5

To a suitable reaction vessel was added a reaction mixture comprised of 2.6 parts of 4-(hexafluoro-2-hydroxy-2-propyl)-aniline, 5 parts of potassium hydroxide and 9 parts of 2,2'-oxydiethanol, as solvent. The resulting reaction mixture was slowly heated to reflux temperature (about 245° C.) and maintained at this temperature for a period of about 2 hours. The crude mixture containing potassium 4-aminobenzoate was cooled and diluted with 100 parts of water. Potassium 4-aminobenzoate was converted to its corresponding 4-aminobenzoic acid by the addition of a dilute aqueous solution of hydrochloric acid until the reaction mixture exhibited a pH of about 7. 4-aminobenzoic acid precipitated out of solution and was purified by extraction with ether and finally isolated by evaporating off the ether. 1.1 parts of 4-aminobenzoic acid as a white solid having a melting point of about 184–186° C. were isolated.

The procedure employed in Example 5 was substantially repeated utilizing various hexahalohydroxyisopropyl aromatic amine derivatives, the results of which are set forth in Table 2.

13 parts of potassium hydroxide, and about 22 parts of 2,2'-oxydiethanol, as solvent. The resulting reaction mixture was heated at reflux temperature (about 245° C.) for a period of about 2 hours. The reaction mixture was then cooled and poured into 100 parts of water and filtered. The resulting filtrate was then acidified with concentrated hydrochloric acid to a pH below 7, whereupon a crude mixture of silicic and isophthalic acids precipitated out of solution. To this crude mixture was added powdered sodium bicarbonate to redissolve the isophthalic acid. The mixture was filtered to remove the still solid silicic acid, decolorized with carbon, reacidified to precipitate out of solution the desired isophthalic acid which was finally isolated by filtration. After drying for a period of 2 hours at a temperature of 150° C., 1.5 parts of isophthalic acid corresponding to a yield of

TABLE 2.—EXAMPLES 6–13

| Hexahalohydroxyisopropyl amine reactant | Carboxylic Acid | Percent Yield [1] | Melting Point, ° C. | |
|---|---|---|---|---|
| | | | Theory [2] | Found |
| 4-(hexafluoro-2-hydroxy-2-propyl)-2-methylaniline. | 3-methyl-4-aminobenzoic | 63 | 169 | 169–170 |
| 2-(hexafluoro-2-hydroxy-2-propyl)-5-methylaniline. | 2-amino-4-methylbenzoic | 73 | 177 | 176–7 |
| 2-(hexafluoro-2-hydroxy-2-propyl)-4-methylaniline. | 2-amino-5-methylbenzoic | 70 | 175 | 172–4 |
| 4-(hexafluoro-2-hydroxy-2-propyl)-2,6-dimethylaniline. | 3,5-dimethyl-4-aminobenzoic | 53 | 242 | 252–4 |
| 4-(hexafluoro-2-hydroxy-2-propyl)-N,N-dimethylaniline. | 4-dimethylaminobenzoic | 61 | 233 | 235–7 |
| 4-(hexafluoro-2-hydroxy-2-propyl)-2-hydroxyaniline. | 3-hydroxy-4-aminobenzoic | 59 | 216 | 213–5 |
| 4-(hexafluoro-2-hydroxy-2-propyl)-3-methoxyaniline. | 3-methoxy-4-aminobenzoic | 60 | 185–187 | 186–7 |
| 2-(hexafluoro-2-hydroxy-2-propyl)-1-naphthylamine. | 1-amino-2-naphthoic | 64 | 205 | 202–3 |

[1] Calculated on the basis of the amount of hexahalohydroxyisopropyl amine derivative charged.
[2] As reported in reference literature.

*Example 14*

To a suitable reaction vessel were charged 4.1 parts of 1,3-bis(hexafluoro-2-hydroxy-2-propyl)benzene, 91 percent of theory and having a melting point of 345–346° C. were obtained.

The following examples further illustrate preparation of carboxylic and dicarboxylic acids.

TABLE 3.—EXAMPLES 15–26

| Hexahalohydroxyisopropyl Aromatic Hydrocarbon Reactant | Carboxylic Acid | Percent Yield [1] | Melting Point, ° C. | |
|---|---|---|---|---|
| | | | Theory [2] | Found |
| 1-(hexafluoro-2-hydroxy-2-propyl)-4-methylbenzene. | 4-toluic | 85 | 179.5 | 178 |
| 1,3-bis(hexafluoro-2-hydroxy-2-propyl)-4-methylbenzene. | 4-methylisophthalic | 80 | 332 | 325 |
| 1-(hexafluoro-2-hydroxy-2-propyl)-3,4-dimethylbenzene. | 3,4-dimethylbenzoic | 30 | 165–6 | 166–7 |
| 1,3-bis(hexafluoro-2-hydroxy-2-propyl)-4,5-dimethylbenzene. | 4,5-dimethylisophthalic | 87 | 335.5 | 330 |
| 1,3-bis(hexafluoro-2-hydroxy-2-propyl)-4,6-dimethylbenzene. | 4,6-dimethylisophthalic | 80 | 320 | 310–20 |
| 1-(hexafluoro-2-hydroxy-2-propyl)-2,4-dimethylbenzene. | 2,4-dimethylbenzoic | 87 | 126 | 125–6 |
| 1,3-bis(hexafluoro-2-hydroxy-2-propyl)-2,5-dimethylbenzene. | 2,5-dimethylisophthalic | 73 | 335 | ([3]) |
| 1-(hexafluoro-2-hydroxy-2-propyl)-3-chloro-4-methylbenzene. | 3-chloro-4-methylbenzoic | 41 | 201 | 206–10 |
| 1-(hexafluoro-2-hydroxy-2-propyl)-naphthalene. | 1-naphthoic | 82 | 160 | 160 |
| 1,4-bis(hexafluoro-2-hydroxy-2-propyl)-naphthalene. | 1,4-naphthalene dicarboxylic | 88 | 309 | 230–40 |
| 4,4'-bis(hexafluoro-2-hydroxy-2-propyl) phenyl ether. | 4,4'-dicarboxyphenyl ether | 89 | ([4]) | 312–5 |
| 4,4'-bis(hexafluoro-2-hydroxy-2-propyl) phenyl sulfide. | 4,4'-dicarboxyphenyl sulfide | 86 | 315 | 335 |

[1] Calculated on the basis of the amount of hexahalohydroxyisopropyl hydrocarbon derivative charged.
[2] As reported in reference literature.
[3] Over 320.
[4] Over 300.

Infrared spectra of the above carboxylic acids were in conformity with those spectra reported in the literature.

Since various changes and modifications may be made in the invention without departing from the spirit thereof, the invention is to be limited only by the scope of the appended claims.

We claim:

1. A process for the preparation of an aromatic carboxylic acid which comprises admixing a hexahalohydroxyisopropyl aryl derivative of the formula

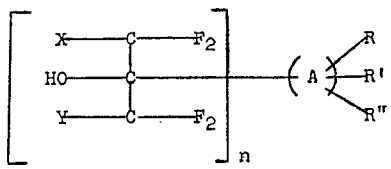

wherein X and Y are halogens independently selected from the group consisting of chlorine and fluorine, $n$ is an integer from 1 to 2, A is an aryl radical, R, R' and R'' are members independently selected from the group consisting of hydrogen, alkyl, alkoxy, hydroxy, amino, dialkylamino and halogen with an alkali metal hydroxide, heating the resulting reaction mixture to a temperature of from about 100° C. to the boiling point of the reaction mixture, acidifying the reaction mixture and recovering the resulting aromatic carboxylic acid.

2. A process in accordance with claim 1 wherein an inert organic solvent is employed.

3. A process in accordance with claim 1 wherein the aryl radical is the phenyl radical.

4. A process in accordance with claim 1 wherein the aryl radical is the naphthyl radical.

5. A process in accordance with claim 1 wherein the aryl radical is derived from phenyl ether.

6. A process in accordance with claim 1 wherein the aryl radical is derived from phenyl sulfide.

7. A process in accordance with claim 1 wherein the molar ratio of the reactants is from about 5 to 10 mols alkali metal hydroxide per mol hexahalohydroxyisopropyl aryl derivative.

8. A process in accordance with claim 1 wherein hexahalohydroxyisopropyl aryl derivative is 2-(1,1,3,3,-tetrafluoro-1,3-dichloro-2-hydroxy-2-propyl)-phenol.

9. A process in accordance with claim 1 wherein hexahalohydroxyisopropyl aryl derivative is 2-(1,1,3,3-tetrafluoro-1,3-dichloro - 2 - hydroxy-2-propyl)-4-methylphenol.

10. A process in accordance with claim 1 wherein hexahalohydroxyisopropyl aryl derivative is 1,4-bis(hexafluoro-2-hydroxy-2-propyl)benzene.

11. A process in accordance with claim 1 wherein hexahalohydroxyisopropyl aryl derivative is 4-(hexafluoro-2-hydroxy-2-propyl)aniline.

12. A process in accordance with claim 1 wherein hexahalohydroxyisopropyl aryl derivative is 2-(hexafluoro-2-hydroxy-2-propyl)phenol.

References Cited by the Examiner

UNITED STATES PATENTS

| 2,766,267 | 10/1956 | Hill | 260—515 X |
| 2,806,883 | 9/1957 | Mikeska et al. | 260—515 X |
| 3,157,605 | 11/1964 | Ver Nooy | 260—653 X |

OTHER REFERENCES

Sheppard, "J. Am. Chem. Soc.," vol. 87, pp. 2410–2411, June 5, 1965.

References Cited by the Applicant

Brewster in Organic Chemistry, Prentice-Hall, Inc., N.Y., second ed., 1954, pp. 125–127.

LORRAINE A. WEINBERGER, *Primary Examiner.*

R. K. JACKSON, *Assistant Examiner.*